Patented Aug. 31, 1937

2,091,305

UNITED STATES PATENT OFFICE 2,091,305

FABRICATED STRUCTURE AND METHOD OF MAKING

Homer W. Butterbaugh, Kenosha, Wis., assignor to The American Brass Company, Waterbury, Conn., a corporation of Connecticut No Drawing. Application July 23, 1935, Serial No. 32,728

4 Claims. (Cl. 113—112)

This invention relates to fabricated structures and the method of making the same, and has for an object to provide an improved fabricated structure made up of shaped members made from a high copper alloy which may be readily worked, such as rolled, extruded or drawn into the various shapes desired and which is particularly adapted for welding so as to produce a strong unitary structure. Such structures are for example architectural structures as window and door frames, moldings and other architectural work, refrigerator evaporators, automobile horns, and numerous other structures.

It is common to use alloys such as brass for moldings, window frames, and similar and other shapes, for architectural and other purposes, and at the joints they are ordinarily connected by solder with a silver or similar solder or riveted, as it has been impossible to make satisfactory welds with these brass shaped members. Welded joints are much more desirable than the soldered or riveted joints as they are more sightly as giving the effect of a unitary one-piece structure and are stronger and more satisfactory than the soldered or riveted joints.

It is therefore an object of the invention to produce these shaped members from an alloy which can be readily worked, as rolled either hot or cold, extruded or drawn into the desired shaped members, and can be readily welded at the joints to do away with the necessity of soldering or riveting to produce better, more sightly, more homogeneous and stronger joints.

I have found that a copper-manganese-zinc alloy comprising from about 70 to 99% copper, 0.01% to 5% manganese, and balance zinc has very good welding properties, that the welds can be easily made, are dense and homogeneous, and when ground off and polished the weld is practically indistinguishable from the remainder of the base metal. The manganese greatly improves the welding properties and inhibits or suppresses the volatilization of the zinc during the welding operation so that the metal of the finished weld is of substantially the same composition as the base metal of the welded member. The weld therefore has practically the same appearance and is indistinguishable from the base metal, and the strength of the weld is practically the same as the base metal of the elements welded.

The preferred alloy comprises in the neighborhood of 84% copper, 15% zinc and 1% manganese, say from 80% to 85% copper, 0.25% to 1.5% manganese and balance zinc, and I have found that shaped members made from this alloy can be readily welded and that the welds are strong, dense and uniform. I have also found that this alloy can be readily worked, and readily rolled, extruded or drawn into the irregular and regular shaped members desired. The material can be used for various structures as architectural structures, such for example as door fronts, building fronts, window frames and similar work, and also for a large number of other fabricated structures, such for example as refrigerator evaporators for which welded structures are practically a necessity for best results, for automobile horns, and similar uses where it is desired that the joints be made by welding, and especially autogenous welding. By autogenous welding I mean welding where the metal of the joint is of substantially the same composition as the base metal of the members being welded and whether the joint is made by adding weld metal, as from a welding or filler rod, or by heating and pressing the elements together, as for example in spot welding.

I have found that members shaped from this worked copper-manganese-zinc alloy have greatly improved welding properties over members made from the ordinary brasses. As the weld is of substantially the same composition as the base metal it has a tensile strength almost equal to that of the base metal. The weld is also very sound and homogeneous and the metal welds readily so that the joints can be easily and readily made.

As above stated the manganese inhibits the volatilization of the zinc in the base metal during the welding operation so that the composition of the weld is substantially the same as that of the base metal. This also reduces the clouds of smoke or vapor so as not to choke the welder during the welding operation. If it were not for the manganese the loss of zinc would be very high especially in making autogeneous welds thus changing materially the composition of the finished weld. With the present alloy after the weld has been made, ground and polished it is practically impossible to detect it as the composition of the weld is practically the same as that of the base metal so that it has the same appearance as the base metal. It is also particularly pointed out that the manganese reduces the porosity of the metal and therefore increases its strength, giving strong dense welds.

Although an alloy having approximately the above noted proportions has proven very satisfactory for the purposes noted I am not limited to this specific alloy as the proportions of the various metals may be varied without destroying its adaptability for working and forming into the shaped members and producing strong, dense welds. However, the amount of manganese is preferably between about 0.25% and 1.5%. The copper is preferably from about 75% to 86%. With the higher percentages of manganese the alloy may not work quite as readily in the mill.

This alloy is also very adaptable for use as a welding or filler rod for welding other metals as well as this particular alloy. I also do not wish to exclude from the alloy small amounts of other elements which do not materially affect or destroy its desirable welding properties or its adaptability for the purposes intended.

Having thus set forth the nature of my invention, what I claim is:

1. A method of making a fabricated structure comprising working an alloy composed of from about 80% to 85% copper, 0.25% to 1.5% manganese and balance zinc, and forming the worked alloy into shaped members, placing the members adjacent each other, and welding the adjacent members together by autogenous welding of the adjacent surfaces so that the metal of the welds is of substantially the same composition as the base metal of the welded members.

2. A method of making a fabricated structure comprising working an alloy composed of approximately 84% copper, 15% zinc and 1% manganese, and forming the worked alloy into shaped members, placing the members adjacent each other, and welding the adjacent members together by autogenous welding of the adjacent surfaces so that the metal of the welds is of substantially the same composition as the base metal of the welded members.

3. A fabricated structure comprising a plurality of members composed of an alloy of from about 80% to 85% copper, 0.25% to 1.5% manganese and balance zinc worked into shaped members, and welded together to form the structure, the metal of the welds being of substantially the same composition as the base metal of the welded members.

4. A fabricated structure comprising a plurality of members composed of an alloy of approximately 84% copper, 15% zinc, and 1% manganese worked into shaped members, and welded together to form the structure, the metal of the welds being of substantially the same composition as the base metal of the welded members.

HOMER W. BUTTERBAUGH.